United States Patent
Voronov et al.

(10) Patent No.: US 7,791,641 B2
(45) Date of Patent: Sep. 7, 2010

(54) SYSTEMS AND METHODS FOR UTILIZING ACTIVITY DETECTION INFORMATION IN RELATION TO IMAGE PROCESSING

(75) Inventors: German Voronov, Bat-Yam (IL); Viktor Ariel, Modiin (IL)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 2199 days.

(21) Appl. No.: 10/356,319

(22) Filed: Jan. 30, 2003

(65) Prior Publication Data

US 2003/0174772 A1 Sep. 18, 2003

Related U.S. Application Data

(63) Continuation-in-part of application No. 10/333,942, filed on Jan. 23, 2003.

(60) Provisional application No. 60/355,185, filed on Feb. 8, 2002.

(51) Int. Cl.
H04N 5/228 (2006.01)
H04N 5/14 (2006.01)
H04N 7/12 (2006.01)

(52) U.S. Cl. ............... 348/208.1; 348/700; 375/240.06; 375/240.12

(58) Field of Classification Search ............. 348/208.1, 348/208.4
See application file for complete search history.

(56) References Cited

U.S. PATENT DOCUMENTS

| | | | |
|---|---|---|---|
| 5,563,652 A * | 10/1996 | Toba et al. | 348/207.99 |
| 5,727,115 A * | 3/1998 | Wada | 348/208.99 |
| 5,900,623 A | 5/1999 | Tsang et al. | |
| 6,011,870 A | 1/2000 | Jeng et al. | |
| 6,046,444 A | 4/2000 | Afghahi | |
| 6,204,524 B1 | 3/2001 | Rhodes | |
| 6,215,113 B1 * | 4/2001 | Chen et al. | 348/308 |
| 6,243,434 B1 | 6/2001 | Hynecek | |
| 6,350,663 B1 | 2/2002 | Kopley et al. | |
| 6,735,250 B2 * | 5/2004 | Inou | 348/699 |
| 6,778,210 B1 * | 8/2004 | Sugahara et al. | 348/208.4 |
| 6,933,973 B1 * | 8/2005 | Sako | 348/308 |

FOREIGN PATENT DOCUMENTS

WO   WO 98/15116 A1   4/1998

OTHER PUBLICATIONS

Marc J. Loinaz. et al., *A 200-mW, 3.3-V, CMOS Color Camera IC Producing 352 X 288 24-b Video at 30 Frames/s*, IEEE Journal of Solid-State Circuits, vol. 33, No. 12, Dec. 1998. pp. 2092-2103.

* cited by examiner

*Primary Examiner*—Luong T Nguyen
(74) *Attorney, Agent, or Firm*—Harness, Dickey & Pierce, P.L.C.

(57) ABSTRACT

Imaging systems and methods for processing images. Various of the imaging systems include a motion detection and/or estimation engine. Information from such a motion engine can be used by one or more of a scene definition engine, a blur reduction engine, an anti-shake engine, and a video compression engine. Various of the methods include processes for accepting motion information from a motion detection and/or estimation engine and performing one or more of the following functions: anti-shake, blur reduction, scene definition, video compression, and power management. In some cases, the various systems and methods can be implemented on a single chip.

21 Claims, 7 Drawing Sheets

SYSTEMS AND METHODS FOR UTILIZING ACTIVITY DETECTION INFORMATION IN RELATION TO IMAGE PROCESSING

CROSS-REFERENCES TO RELATED APPLICATIONS

This application claims priority to U.S. Provisional Application No. 60/355,185, filed Feb. 8, 2002, and entitled "SYSTEMS AND METHODS FOR ACTIVITY DETECTION AND MOTION DRIVEN CONTROL"; and is a continuation-in-part of U.S. application Ser. No. 10/333 942, entitled "CMOS IMAGE SENSOR SYSTEM FOR VIDEO COMPRESSION", filed on Jan. 23, 2003, which claims priority to PCT/US01/29170, filed Sep. 12, 2001, entitled "CMOS IMAGE SENSOR SYSTEM FOR VIDEO COMPRESSION", which in turn claims priority from U.S. Provisional Application No. 60/231,778, filed Sep. 12, 2000, entitled "CMOS IMAGE SENSOR SYSTEM FOR VIDEO COMPRESSION". Each of the aforementioned applications is assigned to an entity common hereto, and is incorporated herein by reference for all purposes.

BACKGROUND OF THE INVENTION

The present invention relates generally to the area of image acquisition and processing, and in particular to image acquisition and processing performed by semiconductor devices.

Various video acquisition systems including cameras and video recorders are known in the art. Advanced versions of such systems include arrays of pixels, such as charged coupled devices, to detect an image and convert the image to an electrical signal. Such devices can be powered by an external power source, or by a battery pack. The power required by such devices often dictates the inclusion of a relatively large battery, where the power source is a battery. In some cases, even a large battery is insufficient to provide for prolonged use. It may not be possible to include a large battery in newer imaging devices. Furthermore, it may be desirable to implement various compression algorithms to reduce the bandwidth required to transmit a processed image. Such compression algorithms can require separate processors that each consume power in addition to the power required to acquire and process an image.

Thus, there exists a need in the art to address these power related limitations. The present invention addresses these limitations along with providing a variety of other novel advances.

BRIEF SUMMARY OF THE INVENTION

The present invention provides systems and methods for receiving, processing, and/or transmitting video images using a central motion estimation and/or detection engine. The present invention provides a variety of functional advantages aided by a motion detection and/or estimation engine. For example, motion blur can be reduced or eliminated by using motion information provided from the motion estimation and/or detection engine. In one particular case, motion blur can be reduced by reducing exposure time or integration time, during which pixels in an imaging array are gathering light or other energy, and by increasing gains associated with the pixel processing. Reducing the integration time bounds the amount of motion that can occur in a detected scene.

As another example, information from the motion estimation and/or detection engine can be used in relation to video compression. Such motion estimation can include the most computationally significant part of a video compression encoder. In accordance with some embodiments of the present invention, the motion estimation and/or detection engine is implemented, either in whole or in part, outside of a corresponding video compression encoder. Thus, the complexity and physical size of the design can be reduced.

As yet another example, information from the motion estimation and/or detection engine can be used to perform compression mode adaptation. This can include, but is not limited to, adjusting a frame-rate to balance between transmission bandwidth and transmission quality. For example, when a scene contains moving objects, the quantization may be increased, which reduces bandwidth for sake of quality.

Further examples can include implementing anti-shake, or camera stabilization processes using information from the motion estimation and/or detection engine. Such can include, but is not limited to, estimation and/or detection of the global motion between two adjacent frames of video. Global motion estimates the movement of a hand or other device holding a camera. Using this information, the field of view, or window, may be successively adjusted in order to produce stable video sequence.

Yet further examples can include powering a camera device based on information provided by the motion estimation and/or detection engine. This can include, but is not limited to, adjusting the frame-rate and/or frame dimensions according to the scene content. In one particular example, such an approach is used in surveillance applications where video is transmitted only when scene change is detected. This approach reduces bandwidth requirements and power consumption. As another example, frame-rate can be adjusted to match the velocity of objects in a scene. Such an approach reduces bandwidth and power consumption, while retaining important details in a scene. In another particular example, only portions of a scene that include movement are transmitted. Power and bandwidth can be saved where only a portion of a frame is computed and/or transmitted.

Additional examples can include providing super resolution, or sub-pixel resolution using motion information provided from the motion estimation and/or detection engine. In this process, registration between two frames is provided, similar to that provided in the estimation of global motion in the previously discussed anti-shake process. By performing the motion estimation external to the super resolution processor, the complexity and size of such a processor can be reduced.

Some embodiments of the present invention provide imaging systems that include an energy detection element that is capable of detecting incident energy in the form of light, sound, radiation, and the like. In particular cases, the energy detection element is a CMOS pixel array. The systems further include a motion detection element operable to receive a first signal derived from the energy detection element and to detect a motion evident in a scene portrayed by the incident energy, and a processing element operable to receive a second signal from the motion detection element and to adjust an image output signal based at least in part on the second signal.

In particular cases, the processing element comprises a readout control system, and in various cases, the imaging system further includes a converter that receives a third signal from the energy detection element, and converts the third signal to the first signal. In some cases, the converter comprises an analog to digital converter. In some cases, the readout control system is operable to adjust a gain parameter of the converter. In various cases, the readout control is also capable of modifying the exposure time of pixels within the energy detection element.

In other cases, the processing system comprises an anti-shake processor. In such cases, the energy detection element can be a CMOS pixel array, and the anti-shake processor can move a subset of the CMOS pixel array within the overall CMOS pixel array based at least in part on the second signal.

In other cases, the processing system comprises a scene definition processor. Such a scene definition processor can be capable of initiating an image output based at least in part on the second signal. In some of the cases, the energy detection element is a CMOS pixel array, and the scene definition processor determines an active portion of the CMOS pixel array based on the second signal.

Other embodiments of the present invention provide imaging systems that include an image acquisition system that generates an image signal. The systems further include a motion estimation and/or detection system that is operable to estimate motion based on the image signal, and operable to generate a motion signal. In addition, the systems include a processing system that generates an output image. Such a processing system can include one or more of an anti-blur engine, an anti-shake engine, and/or a scene definition engine. Further, in some cases, the image acquisition system comprises an image detection array and a converter. Where an anti-blur engine is employed, a gain associated with the converter can be adjusted based on the motion signal. In some cases, the anti-blur engine may further modify the exposure duration in the image detection array.

In some cases, various function of the imaging system can be activated from the motion signal. In various cases, the image acquisition system comprises a pixel array, and an included scene definition engine selects a portion of the pixel array for processing based on the motion signal. In other cases where an anti-shake engine is included, the anti-shake processor moves a subset of the pixel array within the pixel array.

Yet other embodiments of the present invention provide methods for processing images. The methods include receiving an image signal, estimating and/or detecting motion evident in the image signal, and generating an output signal by processing the image signal based at least in part on the motion. In some cases, generating the output signal comprises moving a sub-area of image information within a larger area of image information. In other cases, generating the output signal comprises increasing a gain parameter associated with the image signal. In yet other cases, generating the output signal comprises activating a function of an image processing system, while in further cases, generating the output signal comprises defining a scene that includes an active portion of an image area.

This summary provides only a general outline of the embodiments according to the present invention. Many other objects, features and advantages of the present invention will become more fully apparent from the following detailed description, the appended claims and the accompanying drawings.

BRIEF DESCRIPTION OF THE DRAWINGS

A further understanding of the nature and advantages of the present invention may be realized by reference to the figures which are described in remaining portions of the specification. In the figures, like reference numerals are used throughout several to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
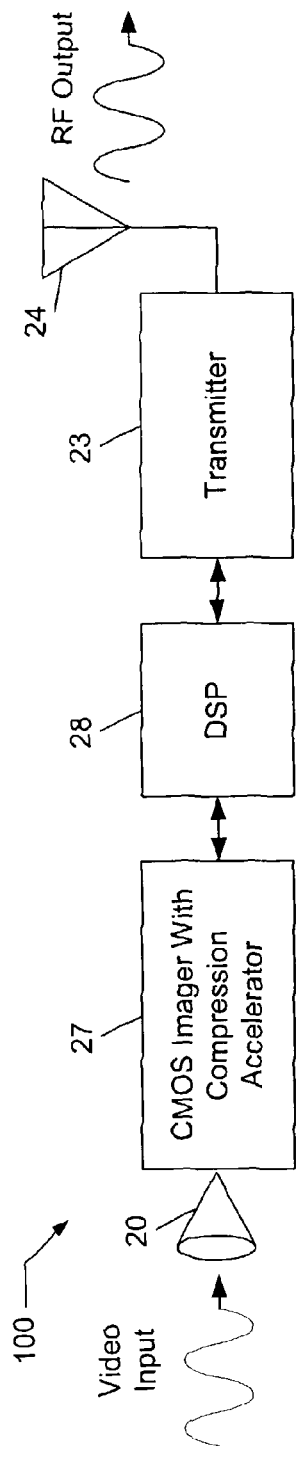
FIG. 1 is a functional block diagram showing a transmitting system in accordance with various embodiments of the present invention.

The present invention provides systems and methods for receiving, processing, and/or transmitting video images using a central motion detection and/or estimation engine. The present invention provides a variety of functional advantages aided by a motion estimation and/or detection engine. For example, motion blur can be reduced or eliminated by using motion information provided from the motion estimation and/or detection engine. In one particular case, motion blur can be reduced by reducing exposure time, or integration time, during which pixels in an imaging array are gathering light. Reducing the integration time bounds the amount of motion that can occur in a detected scene to a limited period.

As another example, information from the motion estimation and/or detection engine can be used in relation to video compression. Such motion estimation can include the most computationally significant part of a video compression encoder. In accordance with some embodiments of the present invention, the motion estimation and/or detection engine is implemented, either in whole or in part, outside of a corresponding video compression encoder. Thus, the complexity and physical size of the design can be reduced.

As yet another example, information from the motion estimation and/or detection engine can be used to perform compression mode adaptation. This can include, but is not limited to, adjusting a frame-rate to balance between transmission bandwidth and transmission quality. For example, when a scene contains moving objects, the quantization may be increased, which reduces bandwidth for sake of quality. Nevertheless, the impact on the perceived quality is small. Further discussion of this can be found in Jerry Whitaker, "DTV, The Revolution in Digital Video", McGraw Hill, 1999.

Further examples can include implementing anti-shake, or camera stabilization processes using information from motion estimation and/or detection engine. Such can include, but is not limited to, estimation and/or detection of the global motion between two adjacent frames of video. Global motion estimates the movement of a hand or other device holding a camera. Using this information, the field of view, or window, may be successively adjusted in order to produce stable video sequence.

Yet further examples can include powering a camera device based on information provided by the motion estimation and/or detection engine. This can include, but is not limited to, adjusting the frame-rate and/or frame dimensions according to the scene content. In one particular example, such an approach is used in surveillance applications where video is transmitted only when a scene change is detected.

This approach reduces bandwidth requirements and power consumption. As another example, frame-rate can be adjusted to match the velocity of objects in a scene. Such an approach reduces bandwidth and power consumption, while retaining important details in a scene. In another particular example, only portions of frames that include movement are transmitted. Power and bandwidth can be saved where only a portion of a frame is computed and/or transmitted.

Additional examples can include providing super resolution, or sub-pixel resolution using motion information provided from the motion estimation and/or detection engine. In this process, registration between two frames is provided, similar to that provided in the estimation of global motion in the previously discussed anti-shake process. By performing the motion estimation external to the super resolution processor, the complexity and size of such a processor can be reduced.

As will be appreciated from the disclosure provided herein, various embodiments of the present inventions provide a low power, high performance and inexpensive imaging device, suitable for portable wireless video communications. The technological challenges overcome by the present invention include low transmission bandwidth of wireless channels, very wide range of captured scenes and illumination conditions, and/or unstable sensor position.

In some embodiments that include transmission of live video, video compression capabilities can be integrated with the present invention. To handle a wide range of scenes and illuminations, appropriate image processing and control mechanisms can be incorporated as well. Improper selection of exposure time may introduce smearing when there are moving objects in the scene. Various embodiments of the present invention provide systems and methods for avoiding improper exposure times. In addition, mobile video communication devices are often hand held and thus susceptible to an unstable physical environment resulting in, for example, shaking or oscillation of the captured image. As a consequence, annoying artifacts are introduced by natural motion of unsupported hand. Some embodiments of the present invention provide systems and methods for alleviating artifacts associated with hand motion. Various of the embodiments and features can benefit from information provided from a motion estimation and/or detection system. Thus, in some cases, a central motion detection engine is implemented.

Various embodiments of the present invention utilize CMOS imager technology. In some such embodiments, the various functions associated with the present invention, including, but not limited to, imaging, analog, and digital circuits are integrated on the same substrate. This technology allows efficient incorporation of all the required components into a singe self-contained chip. One type of application that may benefit from a combination of image sensor and motion estimation in accordance with embodiments of the present invention is a surveillance system. Specifically, in one such embodiment, a remote camera that has detected the presence of moving object, can operate in response to the detected motion. For example, it may engage an alarm or lock the field of view on the moving object.

Various embodiments of the present invention provide an ability to adapt different parameters of output, such as frame-rate, resolution, transmission bandwidth, zoom, and the like to activity of the captured scene. This can be useful in relation to battery-operated systems, since such adaptation can significantly reduce power consumption, and thus, prolong the time between maintenance. In addition, reduction of transmitted information also decreases the storage capacity and bandwidth requirements of the network in which the camera exists.

In some embodiments of the present invention, an image sensor is combined with an image control and motion estimation engine. The captured image is then corrected and enhanced by an image processing block. An activity control mechanism and/or a readout control adapts the operation of the entire system according to the movement in a particular scene as indicated by the motion estimation and/or detection system. The corrected image and the corresponding motion information is supplied in relation to additional processing and transmission. Image motion and activity information can be supplied to a video encoder, which may be an integral part of the system or external device.

The image sensor is a device that converts the incident light or other energy, reflected from the scene, to electrical signals. In some cases, image capture can be controlled, mainly by providing an appropriate exposure time. In addition, if the image sensor has larger dimensions than the required image frame, a window or sub-portion of the array may be selected. This information can be provided to other engines within the system.

The other engines control image capture, by selecting suitable exposure time and frame window. Exposure duration can be optimized in order to extend the dynamic range of the produced image. When illumination is high, the exposure can be short to maintain dynamic range and prevent picture to be overexposed. This is the case when a scene captured under a clear sky. On the other hand, when the illumination is low (e.g., indoor or evening scenes), the exposure can be lengthened to ensure that there was enough light integrated and electrical signals are strong. However, when there is a lot of motion in the scene, such a lengthened exposure can introduce undesired blur artifacts. To prevent existence of these artifacts, some embodiments of the present invention rely on scene activity information, produced by an activity control component, to effect exposure duration. Reduction of exposure may reduce the brightness of the image, which, in some embodiments is compensated by appropriate amplification of the signals via, for example, the increase of one or more gain parameters.

Motion information is also useful to reduce, eliminate or cancel shaking artifacts, introduced by, for example, hand oscillations or movements. This anti-shaking cancellation can be accomplished by selection of an appropriate window that will maintain same field of view in consequent frames. However, window position should be chosen with care, to allow camera pan or other desired changes in field of view.

After a frame is acquired, it can undergo several correction procedures in accordance with various embodiments of the present invention. These procedures can include de-mosaicing, color correction, color space conversion, and the like. These tasks are useful to produce an image with calibrated appearance and in desired format. When lighting conditions do not permit reduction of exposure duration sufficient to eliminate motion blur, suitable processing can be alternatively applied to the captured image, using scene activity information provided by a motion estimation engine, and/or an activity control engine.

The activity control engine processes the motion information produced by a motion estimation engine to evaluate the global activity of the scene. In addition, this engine may also estimate the activity of particular regions inside the frame, and adapt the rate of the acquisition of these regions according to corresponding activity. The aforementioned application is incorporated herein by reference for all purposes. The scene activity information is used by the various engines to set the desired frame-rate, resolution and window, to eliminate motion blur and hand oscillation artifacts; and by the image processing block to perform zoom and other digital image enhancements. In addition, this information is supplied along with the image and motion information. Scene activity can also be used to select appropriate compression parameters.

The motion estimation and/or detection engine is responsible for generation of motion information. Motion estimation may be implemented in a variety of ways. In various embodiments, motion information is supplied to the activity control component for evaluation of appropriate scene capture and image processing parameters. Motion information can also be used in relation to video compression, hence, it is provided along with the image to which it belongs.

The video encoder may be a part of the solution or be an external component. Image motion and scene activity information produced by other part of the system is used in order to reduce the transmission bandwidth of the compressed video. Motion information can be transformed into motion vectors. Scene activity information is helpful to select additional parameters, such as quantization, intra/non-intra mode and the like.

As more fully described in U.S. application Ser. No. 10/333,942, which was previously incorporated herein by reference for all purposes, FIG. 1 is a functional block diagram showing a transmitting system that can be modified to include various systems and methods in accordance with the present invention. As illustrated in FIG. 1, a system 100 includes an optical path 20 that directs light to a single-chip imaging device 27. The single-chip imaging device 27 performs some of the computational burden for compression using a motion estimation engine as further described below. Device 27 has an output which passes to a DSP 28. In some cases, the DSP 28 performs some additional compression and provides an output to a transmitter 23, and thence to the antenna 24. In some embodiments, system 100 is implemented in a video enabled cellular telephone, while in other embodiments, system 100 is implemented in a personal digital assistant, or a laptop computer that is video enabled.

Figure 2:
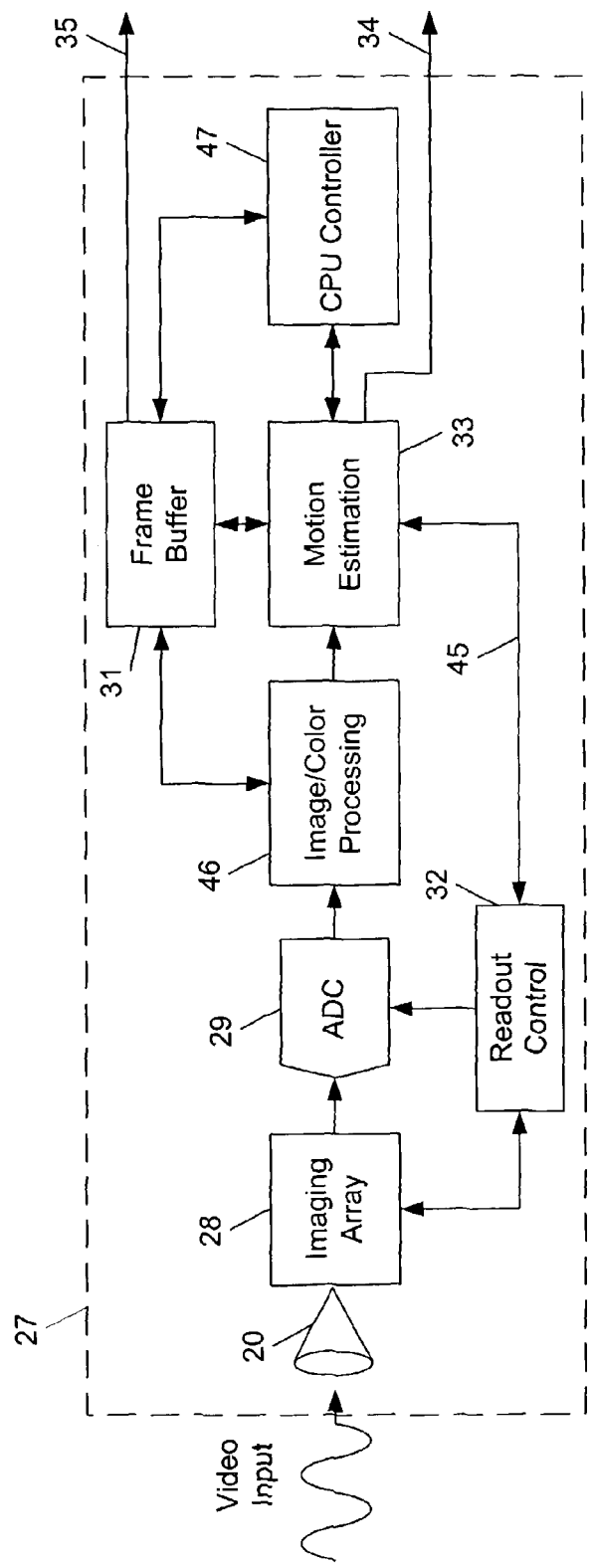
FIGS. 2 through 5 depict functional block diagrams of a image processor including a motion estimation and/or detection engine in accordance with various embodiments of the present invention.

FIG. 2 is a functional block diagram of device 27 used in the system of FIG. 1. As illustrated, there is a CMOS imaging array 28 having an output. In an exemplary embodiment, the array is an array of photodiodes, one per pixel. In one particular embodiment, the array is similar to one or more of the arrays described in Application No. PCT/US02/17358, filed May 29, 2002, entitled "CMOS IMAGER FOR CELLULAR APPLICATIONS, AND METHODS OF USING SUCH", which is assigned to an entity common hereto and incorporated herein by reference for all purposes. Further, the individual pixels can be similar to those described in Application No. PCT/US02/17357, filed May 29, 2002, entitled "A PIXEL SENSOR WITH CHARGE EVACUATION ELEMENT AND SYSTEMS AND METHODS FOR USING SUCH ", which is also assigned to an entity common hereto and incorporated herein by reference for all purposes.

Associated with each photodiode are typically two or more transistors acting as an amplifier. For a color imaging array there are color filters to permit separate collection of color information for each pixel. There is an optical path 20 nearby which is disposed to direct light upon the CMOS imaging array 28. There is an analog-to-digital converter 29 receiving the output of the CMOS imaging array 28, the analog-to-digital converter 29 formed on a single integrated circuit chip 27 with the CMOS imaging array 28 having an output.

Also seen in FIG. 2 is a readout control 32 having outputs, the CMOS imaging array 28 and the analog-to-digital converter 29 each responsive to the outputs of the readout control 32 by reading out contents of the CMOS imaging array 28 and converting said contents from analog to digital signals at rates determined by the outputs of the readout control 32, the readout control 32 formed on the single integrated circuit chip 27 with the analog-to-digital converter 29.

Also depicted in FIG. 2 is a memory 31, or a frame buffer, receiving the digital signal output of the analog-to-digital converter 29, the memory 31 formed on the single integrated circuit chip 27 with the analog-to-digital converter 29. There is also a motion estimation engine 33, the motion estimation engine 33 communicatively coupled with the memory 32 and having a first output 45. In a particular embodiment, the motion estimation is done in an ASIC (application specific integrated circuit) that is formed as part of the single-chip structure. In other embodiments, the motion estimation is performed on a processor implemented on a common die. Readout control 32 can be responsive to the first output 45 for modifying the readout procedure depending on the performance of the motion estimation engine 33.

Memory 31 and the motion estimation engine 33 each have respective outputs 35, 34 communicated external to the single integrated circuit chip 27, the respective output 34 of the motion estimation engine 33 comprising motion vectors.

In an exemplary embodiment, an image/color processing unit 46 provides image and color processing, with outputs to the memory 31 and to the motion estimation unit 33. Such processing includes establishing a good color balance taking into account the qualities of the pixel filters, establishing a white balance, and demosaicing. A processor 47 controls the memory 31, and motion estimation device 33 and optionally handles I/O (input/output) and other functions. An embedded core can coordinate all compression, including doing some of the compression computation. As a matter of the chip fabrication, the CPU can be an embedded core formed on the chip. Alternatively, the CPU can be implemented on an ASIC and form part of a chipset.

Figure 3:
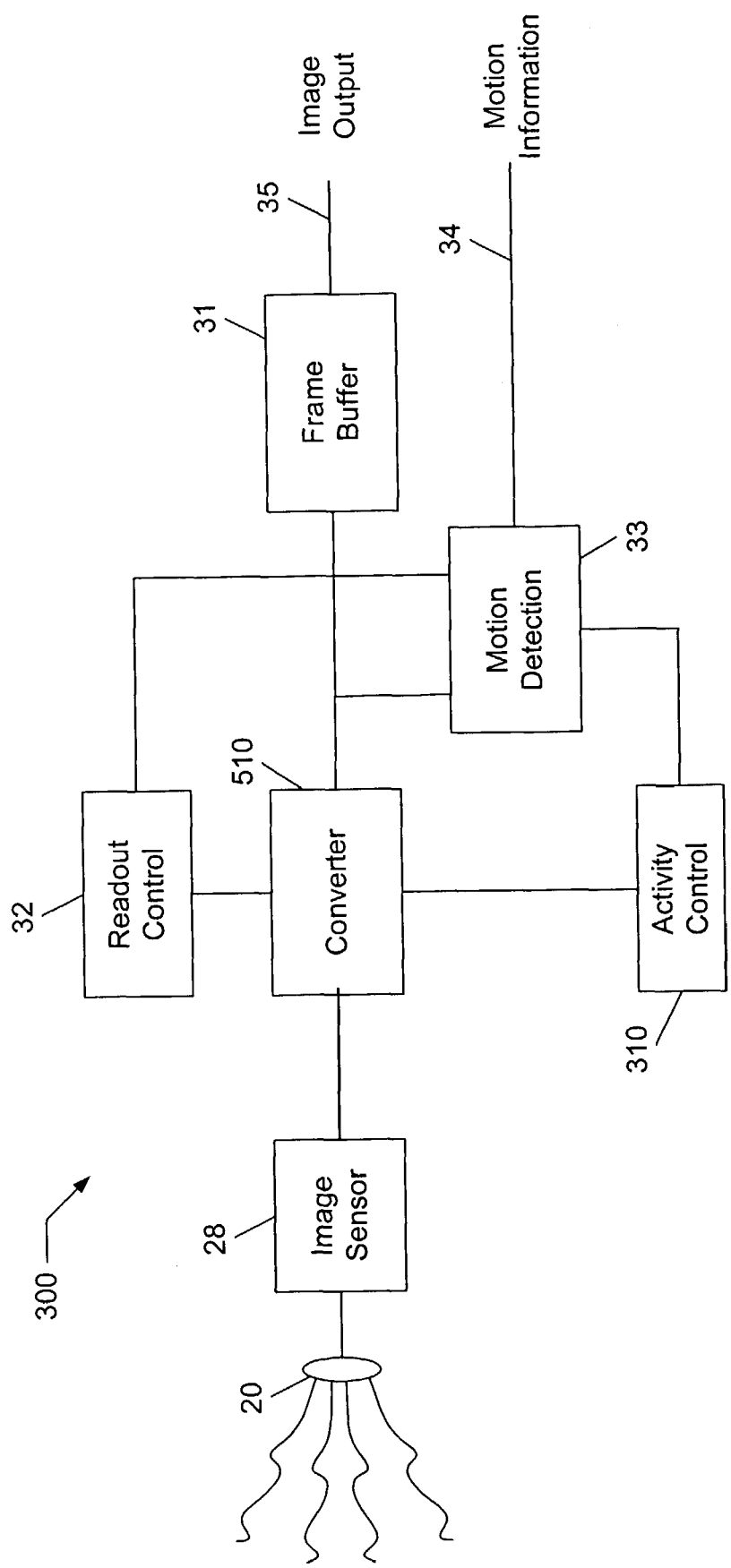

Referring to FIG. 3, a system 300 in accordance with other embodiments of the present invention is illustrated. System 300 includes optical path 20 and an image sensor 28. Image sensor 28 can be any type of image sensor including, but not limited to, a CMOS pixel array, a CCD array, or the like. System 300 further includes a converter 510 that can be, for example, an analog to digital converter, or some other type of converter for transforming signals received from image sensor 28 into signals useful to various other engines or processes implemented in system 300. System 300 also includes readout control 32, frame buffer 31, motion estimation and/or detection engine 33 that are similar to those described in relation to FIG. 2 above. In addition, system 300 includes an activity control 310 that can be implemented to select active portions of a scene for processing and/or transmission.

As illustrated, motion estimation and detection engine 33 receives scene information from converter 510. The scene information is then used to estimate and/or detect motion ongoing in the scene. This motion information can be provided externally via an output 34, and used internally by readout control 32 and/or activity control 310. While not depicted in FIG. 3, a CPU may also be implemented in relation to system 300. Further, a video compression encoder can be implemented either as part of system 300, or in addition to system 300 to receive motion information and provide a compressed video signal.

Figure 4:
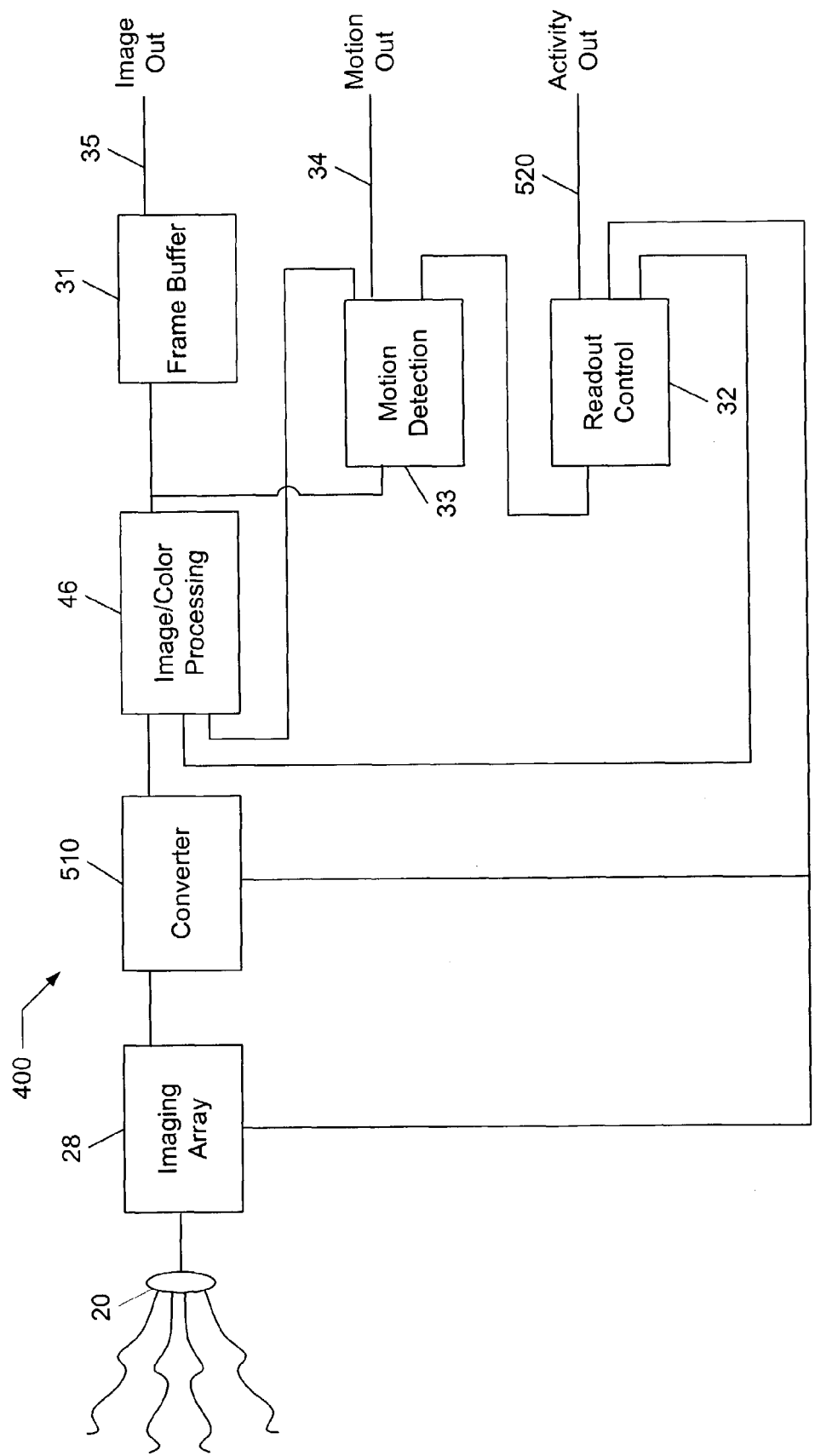

Turning to FIG. 4, a system 400 is depicted. System 400 is similar to system 300, but also includes an image and color processing engine 46. This engine is similar to that described in relation to FIG. 2 above. Motion estimation and/or detection engine 33 receives image output information from image and color processing engine 46 and provide motion information via motion output 34. Motion estimation and/or detection engine 33 further provides motion information to image and color processing engine 46 allowing processing of the image to be modified based on motion within the image or scene. Further, motion information is provided to readout control 32 that in turn controls imaging array 28 and converter 510. As with system 300, system 400 can include additional elements including, but not limited to, a CPU and an activity control.

Figure 5:
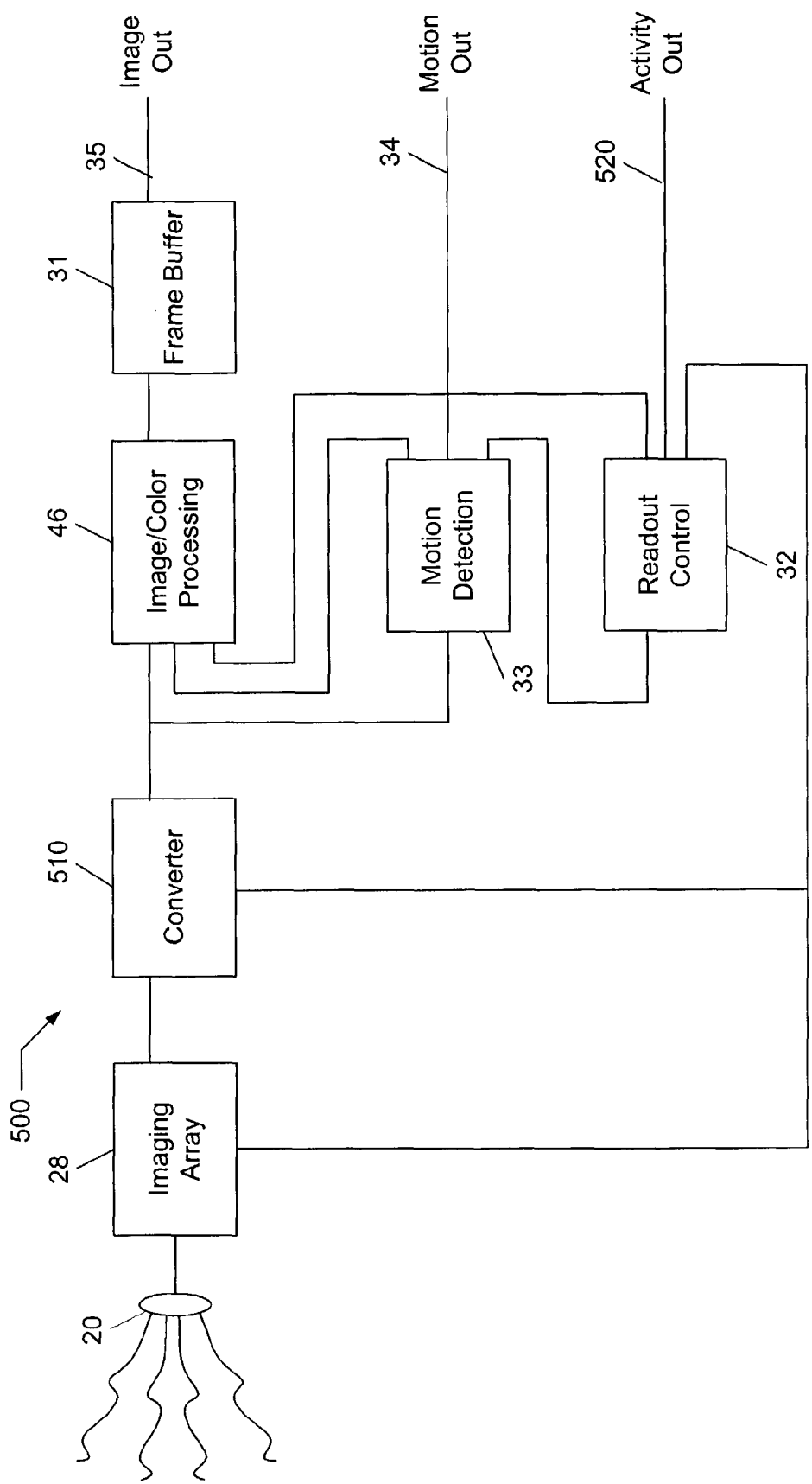

Turning to FIG. 5, a system 500 is depicted. System 500 is similar to system 400, with the exception that readout control 32 can also control image and color processing engine 46. As will be appreciated from the various systems depicted in FIGS. 2 through 5, motion information can be distributed to a number of subsystems within a camera, or imaging device. As such, the motion detection and/or estimation engine can service a number of functions related to image processing and/or transmission. Reusing the information across a number of different subsystems avoids replication of processing circuitry and reduces power consumption. Further, the complexity of designs for the various subsystems can be reduced. Based on the disclosure provided herein, one of ordinary skill in the art will appreciate a number of other advantages inherent in the various inventions disclosed herein. Furthermore, one of ordinary skill in the art will appreciate that various other configurations for systems can be implemented that can use common portions of motion estimation and/or detection. Thus, FIGS. 2 through 5 should be considered as just some of the options that are possible in accordance with the present inventions.

Figure 6:
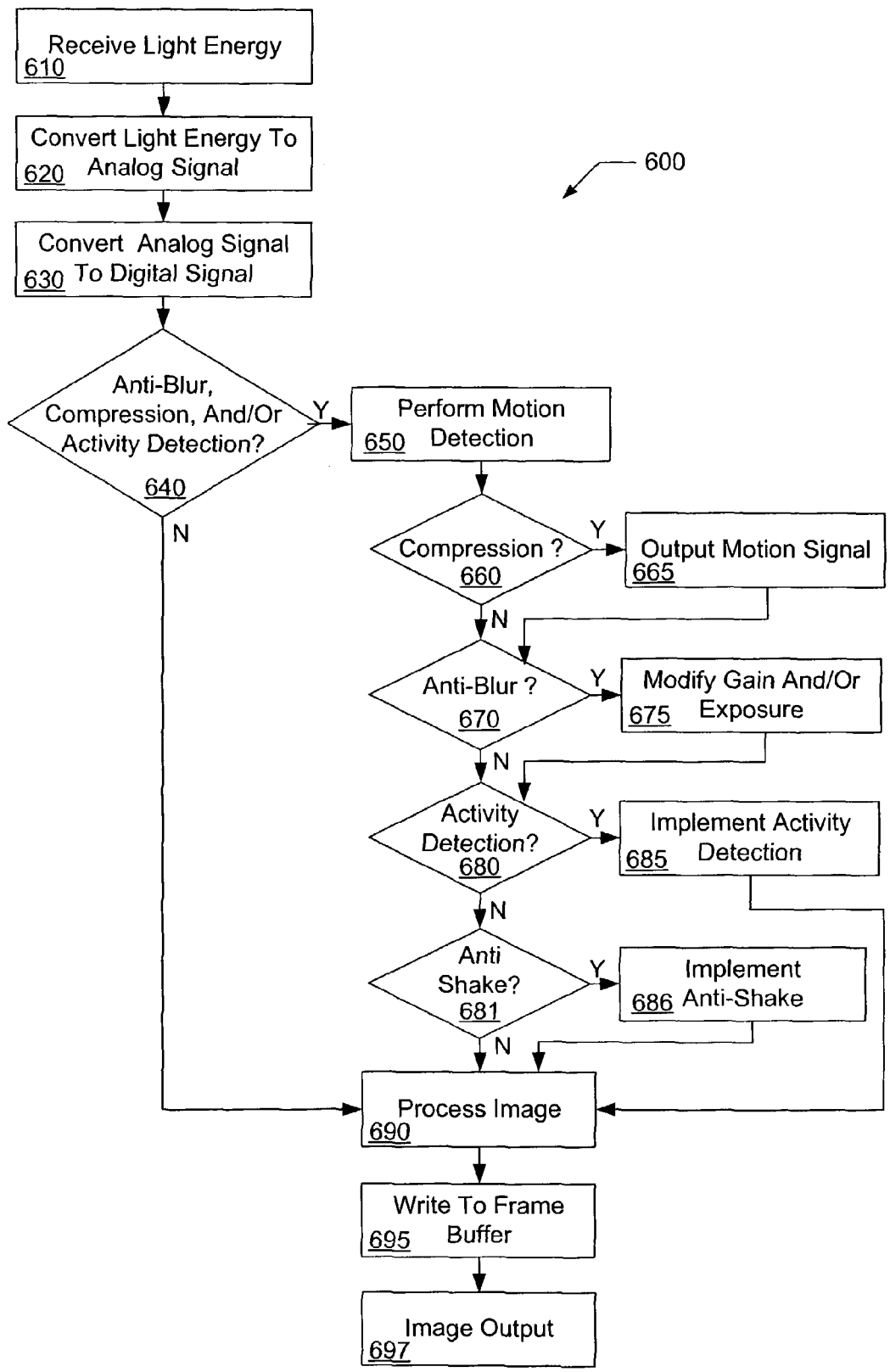
FIG. 6 illustrates various methods for utilizing image processors and/or transmitting systems, such as those depicted in FIGS. 1 through 5, in accordance with embodiments of the present invention.

Various methods in accordance with the present inventions are discussed in relation to FIG. 6. In particular, FIG. 6 includes a flow diagram 600 illustrating a number of steps or processes that can be performed in relation to systems such as those discussed above. Following flow diagram 600, light energy is received at an imaging array (block 610). In some cases, this light energy can be substituted by another type of energy, such as, for example, sound waves as would be found in an ultrasound imaging machine. The received energy is converted to an analog electrical signal (block 620), and the analog electrical signal is subsequently converted to a digital electrical signal using an analog to digital converter (block 630).

It is determined if compression, anti-blur, anti-shake, and/or activity detection is to be performed (block 640). Where none of the aforementioned are to be performed, the detected image is processed using an image and color processors (block 690), written to a frame buffer (block 695), and output as an image signal (block 697). Alternatively, where one or more of the aforementioned processes is to be performed (block 640), a motion estimation and/or detection engine is utilized to provide motion information to one or more subsystems performing the various functions (block 650).

Where compression is to be performed (block 660), motion information is provided to a video compression encoder (block 665). This motion information can be used to perform video compression into formats such as MPEG and others. One of ordinary skill in the art will appreciate the types of compression and variety of algorithms that rely on motion estimation information. The present invention of separating the motion estimation from the compression encoder can be utilized in relation to a number of such compression types and/or algorithms. Furthermore, the motion information can be used to perform compression mode adaptation. This can include, but not limited to, adjusting a frame-rate to balance between transmission bandwidth and transmission quality. For example, when a scene contains moving objects, the quantization may be increased, which reduces bandwidth or storage for sake of quality. As another example, where a scene contains very little movement, a very low compression can be used in conjunction with a reduced frame-rate, thus reducing bandwidth without quality degradation. As will be appreciated by one of ordinary skill in the art, these processes can include sharing motion information with one or more of a video compression encoder, a frame buffer, and/or an image and color processor.

Where anti-blur is to be performed (block 670), motion information is provided to an anti-blur controller that in some cases can be implemented as part of a readout control engine (block 675). In some cases, motion blur appears when the exposure duration, during which the image array is collecting incident light or other energy, is long. At the beginning of the exposure process, the object is projected onto a set of pixels within the image array. As the object moves across the scene, the corresponding image of the object moves across the image sensor. As a result, the object appears as a smear, or blur in the captured image. This is because the image of portions of the object is detected across multiple pixels in the image sensor. By reducing the exposure period, the length of the path the object passes during the light collection process is reduced, as well as the track of the projection. Thus, the amount of smear or blur is reduced. However, as the integration time is decreased, less light can be collected; and the image appears darker. In order to compensate for the darkened image, a gain can be applied to the output(s) of the image array.

In one particular embodiment, integration time, or exposure duration, is decreased when motion is detected in a scene. Thus, motion information is provided from a motion estimation and/or detection engine and provided to a readout control engine. Where the readout control engine detects a certain threshold of movement within the scene, an output is provided to the image array causing a reduction in exposure time. Further, the readout control engine provides an output to the converter causing the application of a gain to outputs from the image array.

In some cases, a number of discrete thresholds of movement are defined. Thus, when movement of a particular threshold is detected, exposure time and gain are adjusted to match the detected discrete threshold. Alternatively, in other embodiments, adjustments in gain and exposure are provided as a function of detected movement. Thus, gain and exposure adjustments can be provided across a smooth continuum of movement quantities.

In theory, motion blur could be eliminated completely by reducing exposure times to a very small amount, and increasing gains to a very high level. However, the signal-to-noise ratio is severely degraded as gains become very high making the produced image very noisy. Thus, there is a tradeoff between the gain that can be used, and the amount of acceptable motion blur. For each imaging system, there is a maximum gain, referred to as $G_{max}$, that can be introduced without significant reduction in the picture quality. The tradeoff between the motion blur and the noise is expressed in terms of maximum gain for a given motion blur in pixels, b, $G_{max}(b)$.

Figure 7:
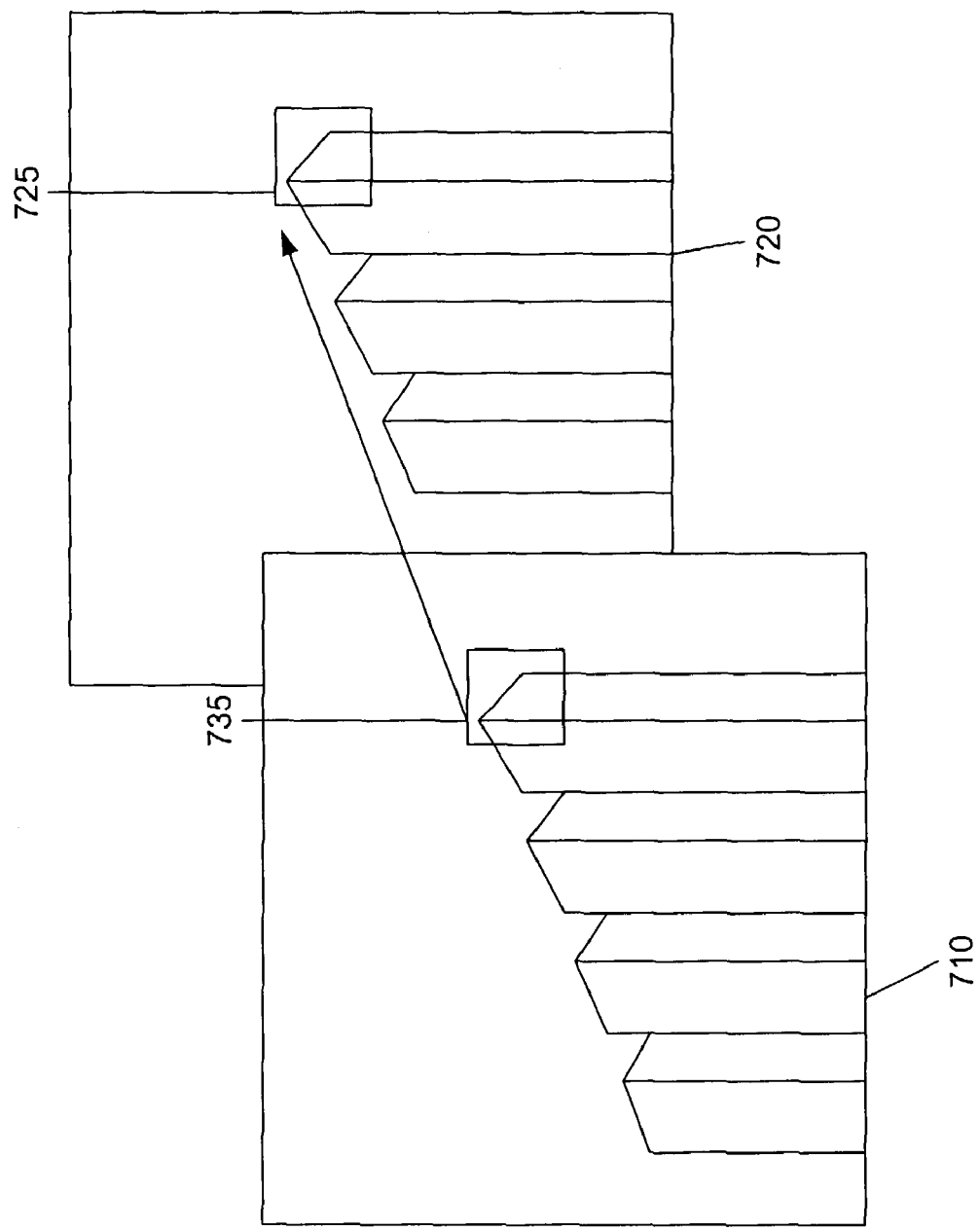
FIG. 7 illustrates a blocking process across multiple frames of video data for performing motion estimation in relation to various embodiments of the present invention.

As previously alluded to, a motion estimation and/or detection engine can produce motion vectors that describe how component portions of an image are changing from one frame to the next. In some cases, the image is divided into blocks, and motion vectors are generated that described the motion of such blocks relative to the same blocks in prior frames. FIG. 7 provides two frames 710, 720 of an exemplary image. Within the frames 720, 730, portions or blocks 735, 725 of the image are defined. Blocks 735, 725 are compared as each successive frame of video is generated. Motion vectors describe where the given block of the current image corresponds to in the previous image.

After motion estimation and/or detection engine has found a motion vector for all parts of the current frame, an activity detection block comprised within the motion engine examines the various vectors and selects the object or area in the scene that exhibits the greatest degree of motion along with the motion vector corresponding thereto, $m_a$. This motion vector is provided by the motion estimation and/or detection engine and is used for evaluation of the exposure period and gains to be used for to capture next frame. The block sizes used to determine the various motion vectors can be pre-defined, or can be variable. For example, where a single object is moving within an otherwise static scene, relatively small blocks may be used, while in scenarios where the camera is panning the entire scene is considered as an object.

Relative velocity, V, is the displacement of the projection of the object onto the image, measured in pixels in seconds. The relative velocity of the most agile object is determined as follows:

$$V_a = \frac{m_a}{T_f}$$

where $T_f$ is the frame period, expressed in seconds. In the case where the exposure duration and gains are not constrained by motion blur limitations, the exposure-gain pair $(\tau_0, G_0)$ is used. The pair $(\tau_0, G_0)$ is selected in order to maximize the picture quality, though other constrains, like a frame-rate limitation, may be present. In this situation the fastest object will be smeared across $$b_0 = V_a \cdot \tau_0$$

pixels. To reduce the motion blur by factor $\alpha$, that is $b = \alpha \cdot b_0$, the required exposure-gain pair should be $(\alpha \cdot \tau_0, G_0/\alpha)$. Consequently, we find the optimal exposure-gain pair for a given imaging system by solving the following equation for $\alpha$, $$G_0 = \alpha \cdot G_{max}(\alpha \cdot b_0) = \alpha \cdot G_{max}(\alpha \cdot V_0 \cdot \tau_0).$$

For example, if for a selected imaging system the maximum gain corresponding to the motion blur is given by $G_{max}(b) = k \cdot b$, where k is a constant depending on the noise generated by the system, then to find the optimal blur reduction, one should solve $$G_0 = \alpha \cdot G_{max}(\alpha \cdot V_a \cdot \tau_0) = \alpha \cdot k \cdot \alpha \cdot V_a \cdot \tau_0.$$

The solution for this system can be $$\alpha = \sqrt{\frac{G_0}{k \cdot V_a \cdot \tau_0}}.$$

Where activity detection is to be performed (block 680), motion information is provided to an activity controller that in some cases can be implemented as part of an activity control engine (block 685). In some cases, imaging devices in accordance with the present invention only output image data when something in the scene changes. Thus, power and bandwidth is not used to transmit an unchanging scene. In such devices, the imaging array is used to detect a scene. The imaging array then passes an electrical signal representative of a detected scene to a converter where the signal is converted to a format useful to the motion estimation and/or detection engine. The motion engine determines if there is any movement ongoing in the scene. Where no movement is ongoing, the image is not processed, and is not transmitted. Alternatively, where movement is detected, the image is processed, updated to the frame buffer and transmitted. Such an approach can be applied to, for example, surveillance cameras that typically monitor static scenes and are only interested in movement occurring within such scenes. In other embodiments, the frame-rate is merely adjusted, rather than stopped altogether where no movement is detected. Thus, for example, where no movement is detected, or very little movement is detected, a very low frame-rate may be processed and transmitted. Alternatively, where significant movement is detected, a higher frame-rate may be transmitted.

Figure 8:
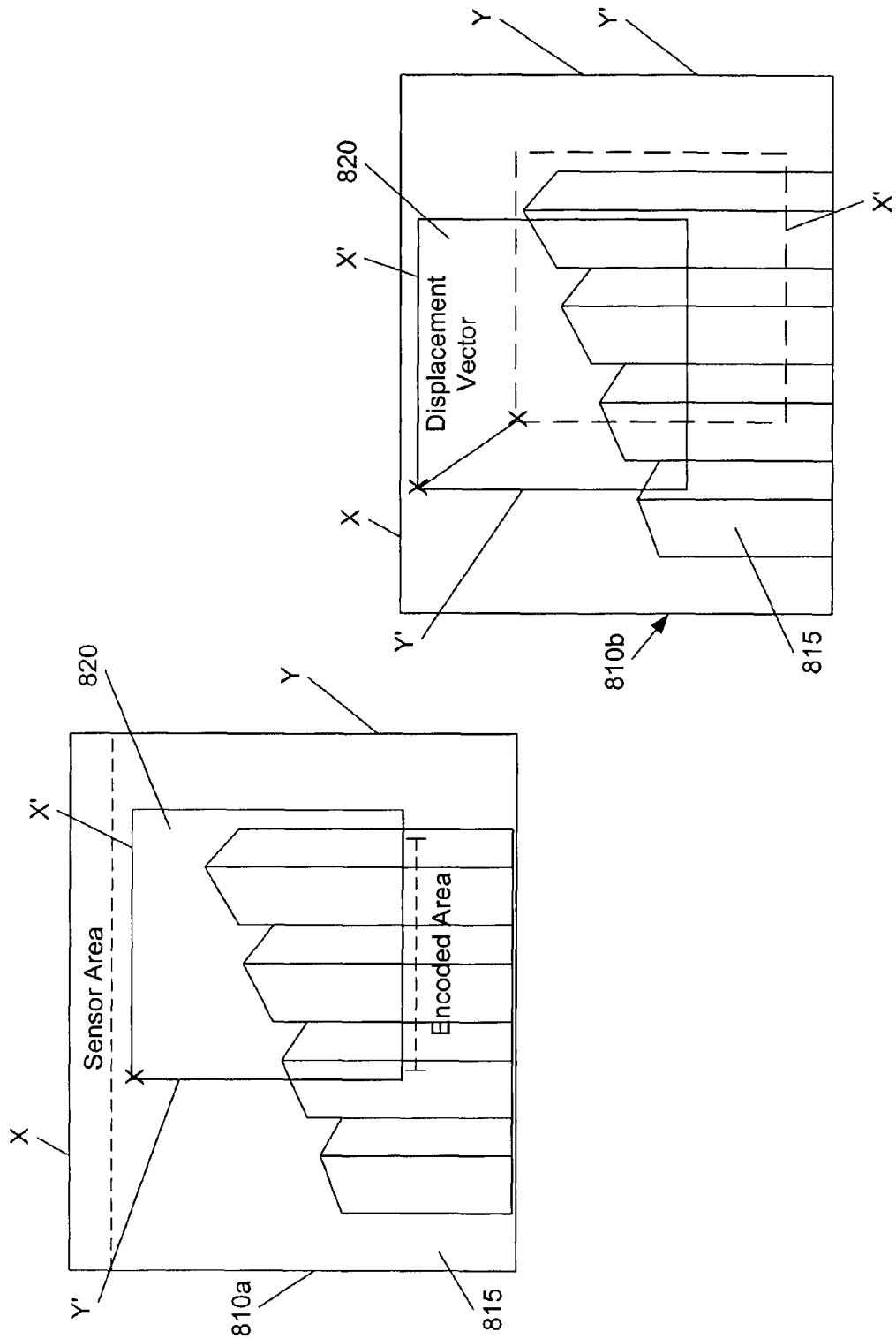
FIG. 8 illustrates a global movement process used in relation to an anti-shake process in relation to various embodiments of the present invention.

In yet other cases, only areas of a scene that include the motion are processed and transmitted. Thus, for example, where movement is ongoing in a central area of a scene, but the remaining portions of the scene are either inactive or exhibit only a very small amount of movement, the image processed may be limited to the moving area of the scene. Such an area can be zoomed and the resolution increased to focus on the movement. This is particularly advantageous where a camera is viewing a significant area, and a high resolution image of movement within the field of view is desired. In this way, a relatively high resolution view can be afforded of the movement, without requiring the considerable bandwidth required to transmit the entire scene at the increased resolution. Further, this can reduce power consumption where all processing steps are not carried out for the entire image.

Where anti-shake is to be performed (block 681), motion information is provided to an anti-shake controller that in some cases can be implemented as part of a readout control engine, or in other cases as part of an image processing engine (block 686). Such anti-shake processes can include using a global motion estimation from the motion estimation and/or detection engine to determine whether the camera is being moved, and therefore the camera's view of a particular scene is being modified. Using this motion information, the readout control can indicate which pixels are read out of an image array. FIG. 8 illustrates one example of this process. As illustrated, two consecutive frames 810*a*, 810*b* of image data include an overall image area 815 and a constant scene 820. The boundaries of constant scene 820 represent an area of the scene that is the same in both frames 810, but that is moving within the overall image area 815 because of movement of the camera. Based on global motion information provided by the motion estimation and/or detection engine the amount of movement of constant scene 820 within the overall image area 815 can be predicted. Using this prediction, constant image area 820 can be displayed such that the movement of the camera is eliminated from the displayed image. Thus, the outer periphery of the overall image area 815 is not displayed, while constant scene 820 is displayed.

The invention has now been described in detail for purposes of clarity and understanding. However, it will be appreciated that certain changes and modifications may be practiced within the scope of the appended claims. Accordingly, it should be recognized that many other systems, functions, methods, and combinations thereof are possible in accordance with the present invention. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. An imaging system, the imaging system comprising:
an energy detection element, operable to detect incident energy;
a motion detection element operable to receive a first signal derived from the energy detection element, to detect a motion evident in a scene portrayed by the incident energy, and to generate a motion signal based on the detected motion; and
a processing element operable to receive the motion signal from the motion detection element and to adjust an image output signal based at least in part on the motion signal by operating on a first subset of information comprised by the first signal and not operating on a second subset of the information comprised by the first signal, the first subset of information corresponding to a portion of the scene where motion is detected, the second subset of information corresponding to a portion of the scene where no motion is detected.

2. The imaging system of claim 1, wherein the processing element includes a readout control system.

3. The imaging system of claim 2 further comprising: a converter, wherein the converter receives a third signal from the energy detection element, and converts the third signal to the first signal.

4. The imaging system of claim 3, wherein the converter includes an analog to digital converter.

5. The imaging system of claim 3, wherein the motion detection element is operable to identify a portion of the scene exhibiting a greatest amount of motion, and generate a motion vector based on the identified scene,
and the readout control system is operable to adjust a gain parameter of the converter based on the generated motion vector.

6. The imaging system of claim 1, wherein the energy detection element includes a CMOS pixel array.

7. The imaging system of claim 5, wherein the readout control system is operable to modify exposure duration associated with the energy detection element based at least on part on the generated motion vector.

8. An imaging system, the imaging system comprising:
an energy detection element, operable to detect incident energy;
a motion detection element operable to receive a first signal derived from the energy detection element, to detect a motion evident in a scene portrayed by the incident energy, and to generate a motion signal based on the detected motion; and
a processing element operable to receive the motion signal from the motion detection element and to adjust an image output signal based at least in part on the motion signal by operating on a first portion of the first signal and not operating on a second portion of the first signal, the first portion of the first signal corresponding to a portion of the scene where motion is detected, the second portion of the first signal corresponding to a portion of the scene where no motion is detected,
wherein the processing element includes an anti-shake processor, the energy detection element is a CMOS pixel array, and the anti-shake processor selects a subset of the CMOS pixel array within the CMOS pixel array based in part on the motion signal.

9. An imaging system, the imaging system comprising:
an energy detection element,. operable to detect incident energy;
a motion detection element operable to receive a first signal derived from the energy detection element, to detect a motion evident in a scene portrayed by the incident energy, and to generate a motion signal based on the detected motion; and
a processing element operable to receive the motion signal from the motion detection element and to adjust an image output signal based at least in part on the motion signal by operating on a first portion of the first signal and not operating on a second portion of the first signal, the first portion of the first signal corresponding to a portion of the scene where motion is detected, the second portion of the first signal corresponding to a portion of the scene where no motion is detected,
wherein the processing element comprises a scene definition processor, and the scene definition processor is operable to initiate an image output based on the motion signal.

10. The imaging system of claim 9, wherein the energy detection element is a CMOS pixel array, and wherein the scene definition processor determines an active portion of the CMOS pixel array based on the motion signal.

11. An imaging system, the imaging system comprising:
an image acquisition system, wherein the image acquisition system generates an image signal;
a motion estimation system, wherein the motion estimation system is operable to estimate motion based on the image signal, and wherein the motion estimation system generates a motion signal; and
a processing system, wherein the processing system generates an output image by operating on a first subset of information comprised by the image signal and not operating on a second subset of the information comprised by the image signal, the first subset of information corresponding to a portion of the image signal where motion is detected, the second subset of information corresponding to a portion of the image signal where no motion is detected,
wherein the processing system includes at least one of an anti-blur processor, an anti-shake processor, and a scene definition processor.

12. The imaging system of claim 11, wherein the image acquisition system includes an image detection array and a converter, the processing system includes the anti-blur processor, the motion estimation system is operable to identify a portion of the image signal exhibiting a greatest amount of motion, and to generate a motion vector based on the identified portion, and the anti-blur processor is operable to modify a gain parameter associated with the converter based on generated motion vector.

13. The imaging system of claim 12, wherein the anti-blur processor is operable to modify exposure duration in the image detection array based on the generated motion vector.

14. The imaging system of claim 11, wherein the imaging system is operable to adjust a frame-rate based on the motion signal.

15. An imaging system, the imaging system comprising:
an image acquisition system, wherein the image acquisition system generates an image signal;
a motion estimation system, wherein the motion estimation system is operable to estimate motion based on the image signal, and to generate a motion signal; and
a processing system operable to receive the motion signal, and to generate an output image by operating on a first subset of information comprised by the image signal and not operating on a second subset of the information comprised by the image signal, the first subset of information corresponding to a portion of the image signal where motion is detected, the second subset of information corresponding to a portion of the image signal where no motion is detected, wherein the processing system includes at least one of an anti-blur processor, an anti-shake processor, and a scene definition processor, and wherein the image acquisition system comprises a pixel array, and the scene definition processor is operable to select a portion of the pixel array for processing based on the motion signal.

16. An imaging system, the imaging system comprising:

an image acquisition system, wherein the image acquisition system generates an image signal;

a motion estimation system, wherein the motion estimation system is operable to estimate motion based on the image signal, and wherein the motion estimation system generates a motion signal; and a processing system, wherein the processing system generates an output image by operating on a first subset of information comprised by the image signal and not operating on a second subset of the information comprised by the image signal, the first subset of information corresponding to a portion of the image signal where motion is detected, the second subset of information corresponding to a portion of the image signal where no motion is detected, wherein the processing system includes at least one of an anti-blur processor, an anti-shake processor, and a scene definition processor, and wherein the image acquisition system comprises a pixel array, and the anti-shake processor is operable to move a subset of the pixel array within the pixel array based on the motion signal.

17. A method for processing images, the method comprising:

receiving an image signal;

estimating motion evident in the image signal; and generating an output signal by processing a first subset of information comprised by the image signal and not processing a second subset of the information comprised by the image signal, the first subset of information corresponding to a portion of the image signal where motion is detected, the second subset of information corresponding to a portion of the image signal where no motion is detected.

18. A method for processing images, the method comprising:

receiving an image signal;

estimating motion evident in the image signal; and generating an output signal by processing a first subset of information comprised by the image signal and not processing a second subset of the information comprised by the image signal, the first subset of information corresponding to a portion of the image signal where motion is detected, the second subset of information corresponding to a portion of the image signal where no motion is detected;

wherein generating the output signal comprises moving a sub-area of image information within a larger area of image information.

19. The method of claim 17, wherein estimating motion includes identifying a portion of the image signal exhibiting a greatest amount of motion, and generating a motion vector based on the identified portion, and generating the output signal includes modifying a gain parameter associated with the image signal based on the generated motion vector.

20. The method of claim 17, wherein generating the output signal comprises adjusting a frame-rate based on the motion signal.

21. A method for processing images, the method comprising:

receiving an image signal;

estimating motion evident in the image signal; and generating an output signal by processing a first portion of the image signal and not processing a second portion of the image signal, the first portion of the image signal corresponding to a portion of the image signal where motion is detected, the second portion of the image signal corresponding to a portion of the image signal where no motion is detected, wherein processing the first portion of the image signal includes defining a scene that includes an active portion of an image area associated with the image signal.

* * * * *